Sept. 24, 1963 J. W. SCHWARTZ 3,105,212

BALANCED MODULATOR OR DEMODULATOR

Filed July 5, 1961

INVENTOR.
JAMES W. SCHWARTZ
BY
A. M. Fernandez
ATTORNEY

United States Patent Office 3,105,212
Patented Sept. 24, 1963

3,105,212

BALANCED MODULATOR OR DEMODULATOR

James W. Schwartz, Phoenix, Ariz., assignor, by mesne assignments, to Norris Grain Company, a corporation Filed July 5, 1961, Ser. No. 155,518
3 Claims. (Cl. 336—87)

This invention relates to balanced modulators of electrical signals and more particularly to a modulator which may be readily adapted to a system for modulating separate signals in a plurality of channels when the modulation of each must bear a constant phase relationship to the others.

A number of different electromechanical and electromagnetic modulators have been devised in the past. A synchronous vibrator having its vibrating reed connected to a signal source and its two contacts connected to opposite ends of a center tapped input transformer has been commonly employed as a modulator when an amplified A.-C. signal proportional to a D.-C. input signal is required in analog-computer operational amplifiers and in servo amplifiers. Electromechanical modulators of that type are satisfactory for many purposes, particularly when low level D.-C. voltage signals must be amplified; but they often require an amplifier having complex feedback and filter circuits.

One type of electromagnetic modulator is the induction modulator which employs the principals of a galvanometer. It consists of a d'Arsonval movement with a coil which is positioned between two magnets by a D.-C. input signal. A modulating A.-C. signal applied to coils wound around the magnets and connected in series induce an A.-C. signal in the moving coil which is proportional to its position as determined by the input signal. The output signal is transformer coupled to the load in order to isolate the load from the D.-C. signal source. Such an induction modulator eliminates many of the problems of a chopper since it does not have vibrating parts; but, its use is rather limited by its delicate d'Arsonval movement.

In more recent years another type of electromagnetic modulator has been developed which may be referred to as bismuth-alloy modulator. It employs alloys of bismuth which have electrical properties that can be modified by a magnetic field produced by a modulating signal. Such a modulator has generally been used only experimentally so that little is known about its disadvantages except that it is sensitive to ambient temperatures since electrical properties of bismuth alloys are sensitive to temperature. In temperature controlled environments, bismuth-alloy modulators may have greater applications than the electromechanical and induction types of modulators since they do not employ moving parts.

Still another type of modulator developed in the past is of the variable-capacitance type comprising a rotating conductive disc eccentrically mounted on a shaft so that as the shaft rotates, the capacitive reactance between the rotating disc and a stationary conductive disc varies in accordance with the shape and relative position between the two discs. Such a modulator has limited applications because, as the capacitance is varied, its bandpass varies.

The object of this invention is to provide an improved balanced modulator and more particularly to provide an inexpensive precision modulator which is not only rugged and reliable but also insensitive to environmental conditions and age of components.

A further object is to provide a modulator which may be readily adapted to a system for synchronously modulating a plurality of signals and more particularly for modulating a plurality of signals out of phase with each other by an arbitrary constant phase angle.

Another object is to provide a device for electromagnetically simulating a mechanical cam which may represent an arbitrary mathematical function for use in electronic analog computers or for electromagnetically obtaining a shaft-position-indicating signal useful in servo systems.

Other objects are to provide a modulator which may be mechanically synchronized with other devices and to provide a modulator which may be adapted to modulate a signal by an arbitrary function.

These and other objects are achieved in an illustrative embodiment of the invention comprising a ferrite core in the shape of an E around which three coils are wound, one around each leg. The two coils around the outer legs are connected in series and so wound as close to the yoke supporting the legs as possible that the voltage signals induced in them by an A.-C. signal applied to the third coil around the center leg are opposite in phase. When wound in that manner the voltage across them is zero volts as long as the substantially balanced flux paths from the center leg across the two air gaps at the open ends of the E-shaped ferrite core are undisturbed. Two metal shields operatively associated with the air gaps are mounted on a drive shaft of a synchronous motor which rotates at the desired modulating frequency. The shields are eccentrically mounted on the drive shaft in such a manner that, as the shaft rotates through one revolution, the two air gaps are alternately modified. The shape of each shield is designed so that as one moves into one gap at a substantially uniform rate, the second moves out of the other gap at the same rate. The result is modulation of the signal applied to the coil of the center leg which may be a D.-C. signal as well as an A.-C. signal. If a D.-C. signal is modulated, the signal derived from the coils wound around the outer legs has an amplitude which is a function of the level of the D.-C. signal and a phase which is a function of its polarity. In order to utilize the invention as a demodulator, it is only necessary to synchronize the excitation signal applied to the synchronous motor with the A.-C. signal applied across the two coils connected in series. In that manner a substantially D.-C. signal is derived from the coil wound around the center leg of the E-shaped core the voltage amplitude of which is a function of the A.-C. signal amplitude and the polarity of which is a function of the phase relationship between the A.-C. signal and the excitation signal applied to the synchronous motor.

In order that the invention may be fully understood, an embodiment thereof is described herein by way of example with reference to the accompanying drawing in which.

Figure 1:
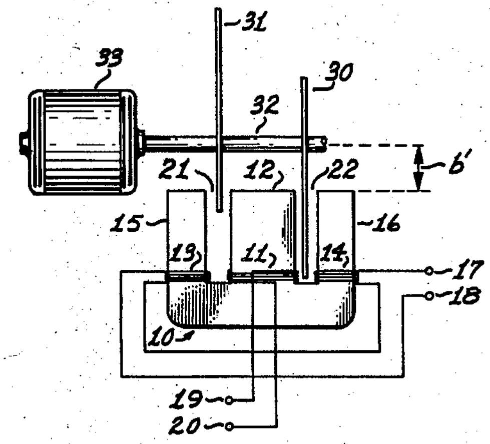
FIG. 1 is a schematic diagram of an embodiment of the invention useful for modulating or demodulating a signal.

In one embodiment of the invention, an E-shaped core 10 made of magnetic material such as cast ferrite has one coil 11 wound around its center leg 12 and a pair of coils 13 and 14 wound around the outer legs 15 and 16, respectively. The coils 13 and 14 are serially connected between a pair of output terminals 17 and 18 and wound in such a way that if an A.-C. signal is applied to terminals 19 and 20 of the coil 11, the voltages induced in the coils 13 and 14 will cancel and the voltage applied to a load connected between the terminals 17 and 18 will be substantially zero.

The cancellation of induced voltages just described assumes that gaps 21 and 22 between the legs of the E-shaped core are air gaps and that the flux linkages of the coils 13 and 14 are equal. If a shield of magnetic or conductive metal is placed in one gap, an output signal is presented at the output terminals 17 and 18, either in phase or out of phase with the input signal depending upon whether the shield is placed in the gap 21 or 22 because the coil 11 acts as a primary winding for two equal but oppositely wound transformers. The flux path for each transformer is from the center leg 12 through the yoke of the E-shaped core 10 supporting the legs and from the outer legs 15 and 16 through the respective air gaps 21 and 22 to the center leg 12. When a relatively broad shield is placed in only one gap, such as a shield 30 in the air gap 22, the flux linkage for one transformer is reduced to substantially zero. The effect is essentially the same as shunting the coil 14.

If the shield 30 is made of magnetic material, the return path for the flux lines is from the center leg 12 through the shield 30 and across the air gap between it and the yoke of the E-shaped core so that very few of the fringing flux lines would link any of the turns of the coil 14 and substantially no voltage would be induced therein. If the shield 30 is made of conductive material to form an electrostatic shield, the result would be virtually the same; the changing flux of the primary field from the coil 11 would induce eddy currents in the shield 30 and produce an equal and opposite magnetic field, thereby cancelling the effect of the primary field and causing a net voltage substantially equal to zero to be induced in the winding 14. Although a result virtually indistinguishable from that obtained by using a magnetic shield is obtained by using an electrostatic shield, the latter is preferred.

By moving the shield 30 in and out of the gap 22 in a cyclic manner while the gap 21 remains undisturbed, the signal coupled to the output terminals 17 and 18 from the input terminals 19 and 20 is modulated 100 percent at the frequency at which the flux linkage from the coil 11 to the coil 14 is cyclically interrupted. The percent of modulation can be increased or decreased by increasing or decreasing the number of turns in the coil 14.

Figure 2:
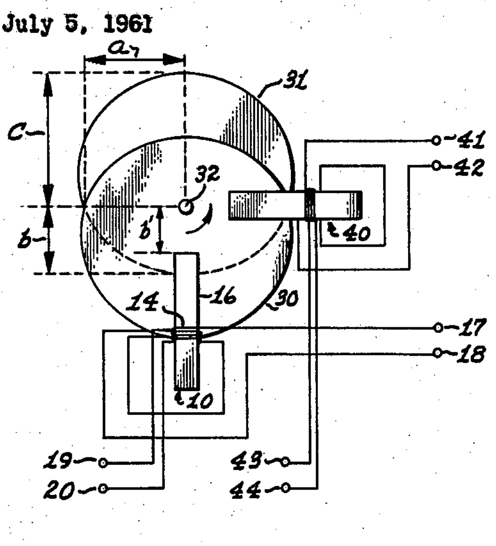
FIG. 2 is a schematic diagram of an embodiment of the invention useful for modulating two signals a quarter of a cycle out of phase.
Figure 3:
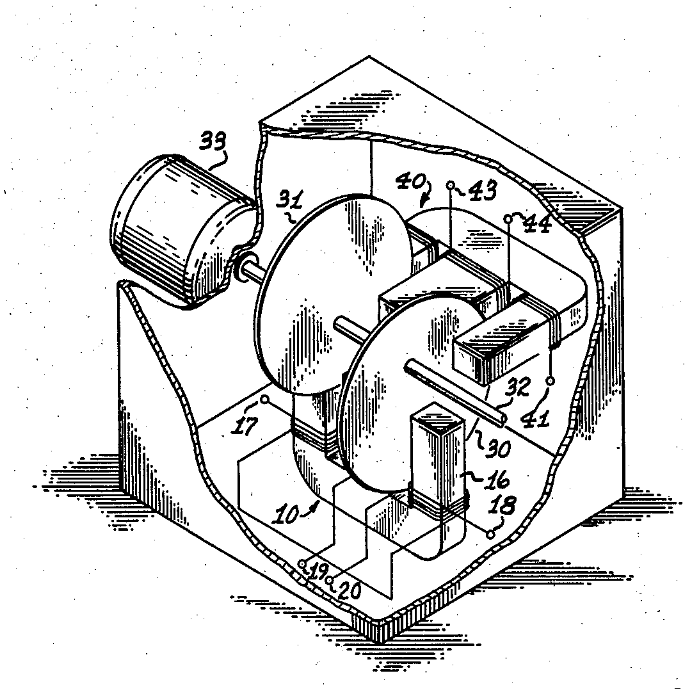
FIG. 3 is a perspective view of the embodiment of the invention illustrated in FIG. 2.

Amplitude and phase modulation may be achieved by providing a second magnetic or electrostatic shield 31 which is synchronously moved in and out of the air gap 21 but out of phase with the first shield 30. That is accomplished by cutting each shield to the approximate shape of a limacon, a geometric curve defined by a quartic curve whose polar equation is:

$$r=a+b\cos\theta$$

when $a$ is greater than $b$ and both $a$ and $b$ are greater than zero. The two shields are oppositely disposed on a shaft 32 as shown in FIGS. 1 and 2 such that the axis of the shaft passes through the origin of the limacons which generally define the two shields. The axis of the shaft 32 is placed a distance $b'$ away from the open side of the E-shaped core. The distance $b'$ is selected to be slightly less than the dimension $b$ and the ratio $a{:}b$ is selected to be approximately 7:4½.

As a motor 33 rotates the shaft, the shields 30 and 31 alternately interrupt the respective air gaps 21 and 22 with which they are associated so that, if the motor 33 is driven at a substantially constant speed, such as at 1,500 revolutions per minute, the effect is modulation of an A.-C. signal coupled to the output terminals 17 and 18 from the input terminals 19 and 20 in such a way that the amplitude of the A.-C. signal varies by the function cos $\omega t$. For example, assume the signal at the input terminals is a directional antenna element having a response to a station at an angle $\theta$ with respect to the antenna directional plane that is given by the following equation:

$$R_1=A_1\cos\theta+A_3\cos 3\theta+A_5\cos 5\theta+\ldots$$

The modulated response is then given by the following equation:

$$R_1=A_1\cos\theta\cos\omega t+A_3\cos 3\theta\cos\omega t+A_5\cos 5\theta\omega t+\ldots$$

A second E-shaped core 40 having a primary winding on its center leg and two series-connected secondary windings on its respective outer legs may be provided and oriented at 90 degrees to the E-shaped core 10, as shown in FIG. 2, if simultaneous modulation of an input signal by the function sin $\omega t$ is desired. The phase difference between the modulation of the signal at the output terminals 17 and 18 of the first E-shaped core 10 and of the signal at the output terminals 41 and 42 of the second E-shaped core 40 is established and maintained constant mechanically so that one modulator does not drift relative to the other. For example, if the input terminals 43 and 44 of the second modulator are connected to a directional antenna element that is oriented electrically and physically at 90 degrees to the antenna to which the input terminals 19 and 20 of the first modulator are connected, the response of the second antenna is effectively modulated by the function sin $\omega t$ so that the response $R_2$ of the second antenna given by the equation $$R_2=A_1\sin\theta+A_3\sin 3\theta+A_5\sin 5\theta+\ldots$$

is modulated by the function sin $\omega t$ and the modulated response of the second antenna is given by the equation $$R_2'=A_1\sin\theta\sin\omega t+A_3\sin 3\theta\sin\omega t+A_5\sin 5\theta\sin\omega t$$

If the two modulated responses $R_1'$ and $R_2'$ are added, the resultant response R is given by the following equation:

$$R=A_1\cos(\theta-\omega t)+A_3\cos(3\theta-\omega t)+A_5\cos(5\theta-\omega t)$$

The first term $A_1\cos(\theta-\omega t)$ is precisely that of a dipole response antenna rotating about its axis at an angular frequency. If the two directional antenna elements have pure dipole responses such that $R_1=A_1\cos\theta$ and $R_2=A_1\sin\theta$, the response of the resultant response R exactly simulates simultaneous rotation of the two dipole antennas. A pure dipolar response for directional ferrite core antennas may be obtained by properly selecting and winding the ferrite core antennas.

Simulation of directional antenna rotation is but one of the many applications contemplated for the present invention. There are many other applications which will readily occur to those skilled in the art including modulation of a D.-C. signal or demodulation of a modulated signal.

The shape of the shields 30 and 31 required to modulate a signal by the function sin $\omega t$ or cos $\omega t$ is substantially defined by the equation $r=a+b\cos\theta$, as noted hereinbefore, which is the equation of a limacon curve. However, owing to the dimensions of the E-shaped core employed and the manner in which the turns of the windings are distributed as close to the supporting yoke as possible, limacon shaped shields may not provide modulation by the exact sinusoidal function desired. For instance, it is believed that precise modulation with limacon shaped shields can be approached only by decreasing the width of the E-shaped core until the intersection of the projection of its legs on the shields intercepts the periphery of the shields at only one point at any given time. Since the E-shaped core must have some cross-sectional area in order that the reluctance of the E-shaped core may be low, precise sinusoidal modulation with limacon shaped shields has not been achieved in practice. Accordingly, to design shields for more precise modulation by the function sin $\omega t$ or cos $\omega t$, the exact shape of the shields may be determined empirically.

It should be understood that the shape of appropriate shields for modulation by other functions may also be defined mathematically or derived empirically, or both and that one, two or more shields may be employed. Accordingly, the following description of a method for deriving the desired shape for the shields to modulate by the function sin $\omega t$ or cos $\omega t$ is presented only as an example and not as a limitation on the broadest aspects of the present invention.

In order to design the shields 30 and 31 empirically for an embodiment of the invention as illustrated, the characteristics of the result desired and the dimensions of the E-shaped core must first be arbitrarily defined. For instance, assume that a constant output impedance is desired and that an input signal $V_1$ is to be modulated by the function sin $\theta$. Then the output signal $V_o$ must vary from 0 volt to some maximum value $V_m$ which is determined only by the turns ratio selected for the coils 11, 13 and 14 after the dimensions $b$ and and $c$ indicated in FIG. 2 have been selected. The ratio of the dimension $b$ to $c$ is selected to provide the specified constant output impedance.

Figure 4:
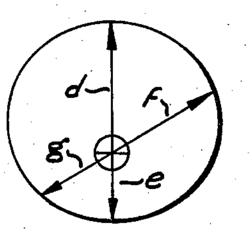
FIG. 4 is a diagram illustrating the manner in which the electromagnetic shield employed in the embodiments of FIGS. 1 and 2 may be designed.

Having selected the dimensions $b$ and $c$, two metal shields having the approximate shape of a limacon, as shown in FIG. 4, are cut and placed in the positions illustrated in FIGS. 1 and 2. The exact shape may then be determined empirically in the following manner, using only one E-shaped core as illustrated in FIG. 1. The output impedance across the terminals 17 and 18 is first measured using an inductance meter with no input signal at the terminals 19 and 20. Then the output signal amplitude is measured with a constant input signal. Following that, the shaft 32 is rotated through 180° in successive steps of five or ten degrees. At each step the dimensions of that part of each shield extending from the shaft 32 into the gaps 21 and 22 is adjusted until the output signal is at the desired amplitude and the output impedance is the same as the original output impedance. For instance, initially the dimension $d$ (FIG. 4) extending into the gap 22 is selected to be one unit and the dimension extending into the gap 21 is selected to be half of one unit. The output signal $V_o$ then has a maximum output signal $V_m$ and the impedance has a value of, for example, 40 mh. Keeping the output impedance constant, at each position of the shaft the dimensions of those portions of the shields extending into the gaps are adjusted until the output signal $V_o$ is equal to $V_m \sin \theta$ where $\theta$ is the angle through which the shaft has been rotated. For instance, after the shaft 32 has been rotated 30 degrees, the dimensions $f$ and $g$ are adjusted until the output signal $V_o$ is one half the maximum output signal $V_m$, since the sine of 30 degrees is equal to 0.5. At the same time, the output impedance is maintained constant at 40 mh. The process is repeated at each position of the shaft through 180°. For the illustrative embodiment, the second half of each shield is symmetrical to the first half so that it is unnecessary to perform the same steps for positions from 180° to 360°.

Instead of starting with shields of approximately the desired shape, two large square shields may be moved in and out to simulate the rotation of the desired shields while preparing a chart of appropriate dimensions which produce the desired ratios of the output signal $V_o$ to the maximum output signal $V_m$ that correspond to the values of the sine function for the independent variables of 0 to 180°, keeping the output impedance constant.

An alternative method which may be employed comprises plotting curves showing how the output signal amplitude varies with various combinations of dimensions of the shields extending into the gaps 21 and 22 and how the output impedance varies with the same combinations of dimensions. Then those combinations which provide the desired output signal amplitudes for the desired output impedance may be employed to produce shields for modulating the output signal according to other functions and, if desired, to maintain the input impedance constant instead.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. Apparatus comprising a first E-shaped magnetic core having a center leg parallel to first and second outer legs, thereby providing first and second parallel gaps, first and second coils wound around said first and second outer legs, respectively, said first and second coils being connected in series and oppositely wound, a third coil wound around said center leg, first and second magnetic flux shields each comprising a metal disc fixedly mounted parallel to each other on a shaft, said discs being eccentrically mounted with respect to their center of mass, the center of mass of one being disposed on the opposite side of said shaft relative to the center of mass of the other, said first and second discs being disposed in planes passing through said first and second parallel gaps, respectively, and means for rotating said shaft about its longitudinal axis, whereby said discs move in and out of their respective gaps, one moving in while the other is moving out, in order to cyclically vary the flux linkages between said third coil and said associated first and second coils in accordance with functions of time determined by the shape of said discs.

2. An apparatus as defined in claim 1 wherein the shape of each of said discs is approximately defined by the polar equation $r=a+b \cos \theta$, where $a$ is greater than $b$ and the origin coincides with the center of rotation of said discs, whereby said function of time is sinusoidal.

3. An apparatus as defined in claim 1 including a second E-shaped magnetic core having a center leg with a coil parallel to first and second outer legs, and being disposed relative to said discs in the same manner as said first E-shaped core and being oriented relative to said first E-shaped core at an arbitrary angle, fourth and fifth coils wound around said first and second outer legs of said second E-shaped core, said fourth and fifth coils being connected in series and oppositely wound, and a sixth coil wound around said center leg of said second E-shaped core, whereby the variations in flux linkages between said third and sixth coils and their respectively associated first and second coils and fourth and fifth coils are maintained at a constant phase angle equal to said arbitrary angle.

References Cited in the file of this patent

UNITED STATES PATENTS

| | | |
|---|---|---|
| 2,004,613 | Meacham | June 11, 1935 |
| 2,118,040 | Durkee et al. | May 24, 1938 |
| 2,631,272 | Smith | Mar. 10, 1953 |